(12) United States Patent
Moens

(10) Patent No.: US 8,945,257 B2
(45) Date of Patent: Feb. 3, 2015

(54) LIQUID SEPARATOR

(75) Inventor: Wim Moens, Affligem (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 113 days.

(21) Appl. No.: 13/255,256

(22) PCT Filed: Apr. 22, 2010

(86) PCT No.: PCT/BE2010/000034
§ 371 (c)(1),
(2), (4) Date: Sep. 8, 2011

(87) PCT Pub. No.: WO2010/124349
PCT Pub. Date: Nov. 4, 2010

(65) Prior Publication Data
US 2011/0315018 A1   Dec. 29, 2011

(30) Foreign Application Priority Data
Apr. 27, 2009  (BE) .................................. 2009/0267

(51) Int. Cl.
*B01D 50/00* (2006.01)
*B01D 46/00* (2006.01)
*B01D 46/42* (2006.01)
*B01D 46/24* (2006.01)

(52) U.S. Cl.
CPC ........ *B01D 46/2411* (2013.01); *B01D 46/0004* (2013.01); *B01D 46/4272* (2013.01); *B01D 46/0031* (2013.01); *B01D 2271/027* (2013.01); *B01D 46/0043* (2013.01); *B01D 46/0005* (2013.01); *B01D 46/0087* (2013.01); *B01D 46/0046* (2013.01); *B01D 50/002* (2013.01); *B01D 46/0084* (2013.01)
USPC ................ 55/337; 55/459.1; 55/309; 55/310; 55/312; 55/313

(58) Field of Classification Search
CPC ...... B01D 50/002; B01D 45/12; B01D 45/16; B01D 46/2411; B04C 5/04
USPC ................ 55/309, 310, 312, 313, 337, 459.1
See application file for complete search history.

(56) References Cited

U.S. PATENT DOCUMENTS

| 3,364,658 A | * | 1/1968 | Walker ............................ 55/309 |
| 4,071,337 A | | 1/1978 | Evans |

(Continued)

FOREIGN PATENT DOCUMENTS

| CN | 1297368 A | 5/2001 |
| CN | 201121516 Y | 9/2008 |

(Continued)

OTHER PUBLICATIONS

International Search Report in PCT/BE2010/000034, Oct. 6, 2010.

(Continued)

*Primary Examiner* — Dung H Bui
(74) *Attorney, Agent, or Firm* — Bacon & Thomas, PLLC

(57) ABSTRACT

A liquid separator is provided with a vessel which defines a space which is sealed at the top by a lid in which is situated an outlet. A pipe is provided in the space extending round the outlet in the space, as of the lid. A fine filter also extends in the space round the outlet such that between the pipe and the fine filter is defined an outlet zone which is connected to the environment by means of a safety valve. The safety valve is connected to the outlet zone via a passage in the lid.

14 Claims, 4 Drawing Sheets

(56) References Cited

U.S. PATENT DOCUMENTS 5,800,581 A 9/1998 Gielink et al.
6,422,395 B1 * 7/2002 Verdegan et al. ............ 210/411

FOREIGN PATENT DOCUMENTS

| | | |
|---|---|---|
| JP | 8-4660 A | 1/1996 |
| WO | 9937386 | 7/1999 |

OTHER PUBLICATIONS

Written Opinion in PCT/BE2010/000034, Oct. 6, 2010.

First Office Action from State Intellectual Property Office of the People's Republic of China (SIPO) for Chinese patent application 201080004904.1, May 6, 2013.

* cited by examiner

LIQUID SEPARATOR

The present invention concerns a liquid separator.

In particular, the invention concerns a liquid separator which is provided with a vessel which, preferably but not necessarily, is cylindrical, which vessel has an inlet for a liquid/gas mixture and whereby this vessel also defines a space which is sealed at the top by means of a lid in which is situated an outlet to discharge treated gas, whereby in the above-mentioned space, a pipe is provided on the one hand, extending round the above-mentioned outlet as of the above-mentioned lid, and a fine filter on the other hand which also extends round the above-mentioned outlet and as of the above-mentioned lid, such that an outlet zone is defined between the pipe and the fine filter.

Between the pipe and the side wall of the vessel is defined an inlet zone through which the liquid/gas mixture to be treated is guided, such that a first separation phase takes place in this inlet zone.

At the bottom of said inlet zone, a second separation phase takes place as the liquid/gas mixture is forced to flow round the far end of the pipe and to change direction in this way.

The above-mentioned fine filter may be formed of a jacket provided with filter material and of a filter lid which seals the fine filter at the bottom. While the fine filter is being flowed through, a third separation phase takes place.

The above-mentioned outlet zone is connected to the environment by means of a safety valve.

As soon as there is an excess pressure in the vessel, the safety valve will open and the liquid/gas mixture will be blown off, as a result of which the pressure in the vessel is normalised.

Blowing off mixture from the inlet zone is not appropriate, as the safety valve must be made considerably larger in that case since the mixture in the inlet zone contains more liquid than the mixture in the outlet zone.

Blowing off mixture after the fine filter has been flowed through is not an option either, given the pressure drop prevailing over the fine filter.

Traditionally, the safety valve is connected to the outlet zone via an opening in the pipe.

A disadvantage thereby is that, due to existing tolerances, it is not possible to separate the inlet zone completely from the outlet zone. This results in a leakage flow whereby liquid/gas mixture flows from the inlet zone, via the above-mentioned opening in the pipe, to the outlet zone.

Such a leakage flow is disadvantageous, as the fine filter makes direct contact with the above-mentioned leakage flow of the liquid/gas mixture, without the mixture of the leakage flow having been subjected to the first and second separation phase, as a result of which the fine filter is rapidly saturated with liquid, which has a disadvantageous influence on the lifetime of said fine filter.

Moreover, due to the existence of a leakage flow, the safety valve will blow off a part of the liquid/gas mixture coming from the inlet zone. However, the safety valve is not dimensioned to blow off such an unfiltered mixture coming directly from the above-mentioned inlet zone.

It is clear that, in this way, the first two separation phases are skipped, which is disadvantageous to the performance of the liquid separator.

Logically, the distance between the opening in the pipe and the safety valve is kept as small as possible. Consequently, the safety valve is traditionally mounted in the side wall of the vessel.

Mounting the safety valve laterally on the vessel provides the known liquid separator with an irregular shape. This implies some restrictions to the way in which the liquid separator can be integrated in a larger system.

The present invention aims to remedy one or several of the above-mentioned and/or other disadvantages by providing a liquid separator which is equipped with a vessel having a housing which comprises an inlet for a liquid/gas mixture and which defines a space which is sealed at the top by means of a lid in which is situated an outlet to discharge treated gas, whereby a pipe is provided in the above-mentioned space on the one hand, extending round the above-mentioned outlet, as of the above-mentioned lid, and a fine filter on the other hand which also extends round the above-mentioned outlet and as of the above-mentioned lid, such that an outlet zone is defined between the pipe and the fine filter which is connected to the environment by means of a safety valve, whereby, according to the specific characteristic of the invention, the safety valve is connected to the above-mentioned outlet zone via a passage in the lid.

The advantage of such a liquid separator according to the invention is that no opening must be provided in the pipe to connect the safety valve to the outlet zone. As a result, no leakage flow of mixture flowing from the inlet zone to the outlet zone will be produced via said opening.

It is clear that the preceding has a positive effect on the performance and the lifetime of the liquid separator according to the invention.

Another advantage of a liquid separator according to the invention is that less operations are required to produce and assemble it than in the case of conventional liquid separators.

According to a preferred embodiment, the safety valve is fixed to the lid, preferably directly in the above-mentioned passage in the lid, for example as the safety valve is provided with a threaded nipple with which the safety valve is screwed down in the passage.

This is advantageous in that the safety valve does not noticeably influence the outside dimensions of the liquid separator, such that a compact liquid separator is obtained.

The liquid separator also preserves its regular shape, making it easy to integrate the liquid separator in a larger system.

According to another preferred aspect of the invention, a first sealing ring is provided between the lid and the housing.

An advantage thereof is that, while the liquid separator is operational, no leak flow to the environment can occur.

Another preferred characteristic of the invention consists in that the side wall of the vessel is provided with a rebate at the top and in that the fine filter is provided with an outward directed flange at the top which is held in the above-mentioned rebate. Preferably, a second sealing ring is provided between the above-mentioned lid and the flange of the fine filter.

An advantage thereby is that the ultimately treated gas cannot be contaminated by any liquid/gas mixture coming from the inlet zone and/or the outlet zone of the liquid separator.

It is clear that the performance of the liquid separator increases as a result thereof.

In order to better explain the characteristics of the invention, the following preferred embodiments of a liquid separator according to the invention are described by way of example only, without being limitative in any way, with reference to the accompanying drawings, in which:

FIG. 1 schematically represents a liquid separator according to the invention, seen in perspective;

Figure 1:
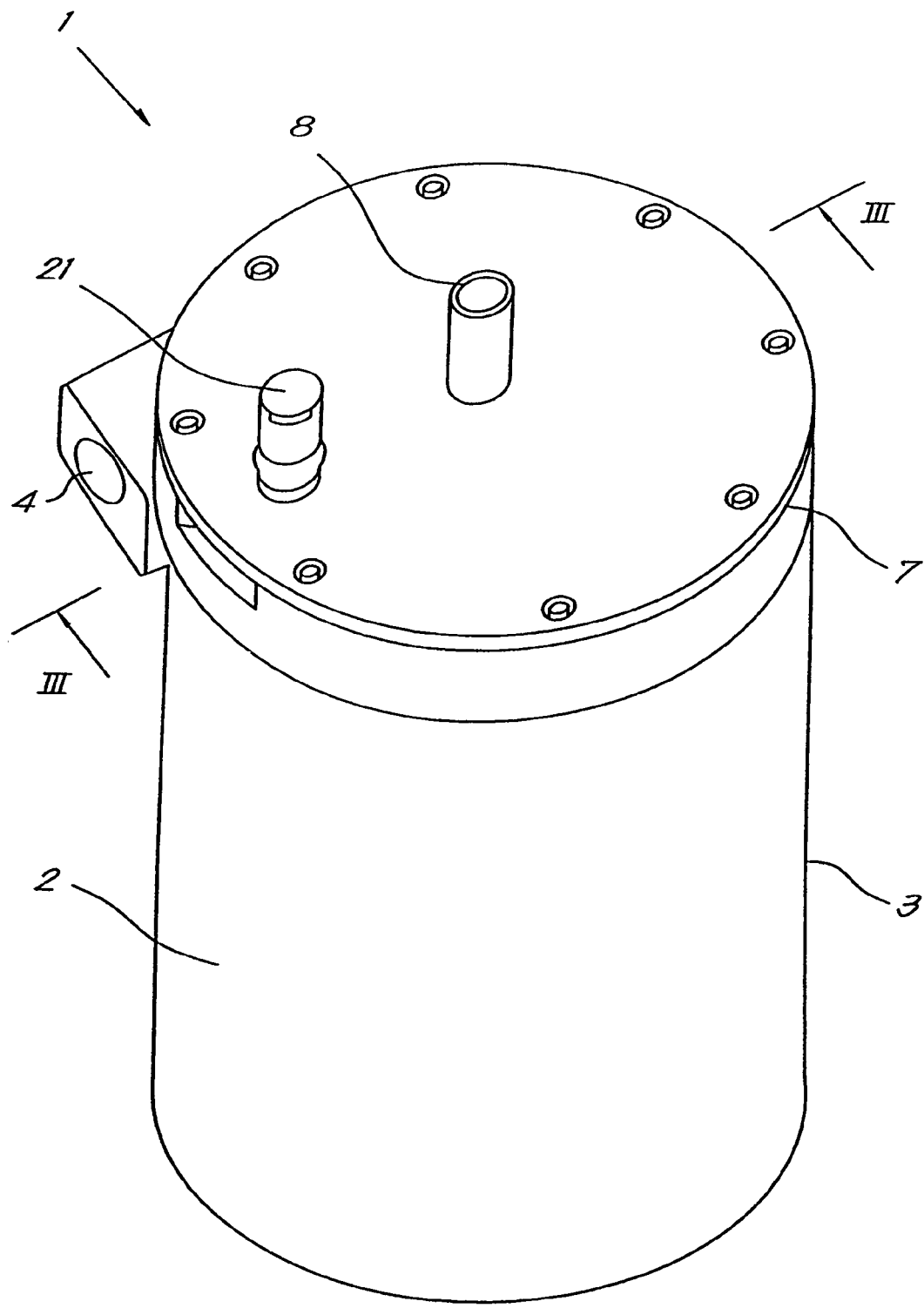

The liquid separator 1 as shown in the figures is provided with a vessel 2 having, in this case, a cylindrical housing 3 provided with a tangential inlet 4 for a liquid/gas mixture and a fine filter 5, positioned centrally in the housing 3, having a jacket 6 provided with filter material.

According to the invention, the above-mentioned housing 3 does not necessarily have to be cylindrical; on the contrary, it may also have other shapes. It should also be noted that the inlet 4 must not necessarily be positioned tangentially, but that it may also be embodied otherwise, for example radially.

The fine filter 5 is in this case provided centrally in the housing 3, but this is not strictly necessary according to the invention. The embodiment of the fine filter 5 with a jacket 6 is described by way of example, but the invention is not restricted to such an embodiment of the fine filter 5. An example of a fine filter 5 that can be used is a coalescence filter.

The housing 3 defines a space which is sealed at the top by a lid 7 in which is situated an outlet 8 to discharge treated gas and which, in this case, is limited below by a bottom 9 which possibly comprises a drain 10 for separated liquid.

Naturally, the drain 10 must not necessarily extend through the above-mentioned bottom 10, but it may also be provided through the cylindrical side wall of the housing 3, or even through the lid 7. In the latter two cases, what is called a 'scavenge line' may for example be provided in the liquid separator 1, which draws in separated liquid as of the bottom of the liquid separator 1.

Further, the liquid separator 1 is provided with a pipe 11 extending in the above-mentioned space and round the above-mentioned outlet 8, preferably but not necessarily in the axial direction of the housing 3 or practically in this axial direction, as of the lid 7 up to a distance from the bottom 9.

Said pipe 11 is situated between the side wall of the vessel 2 and the fine filter 5, in particular between the above-mentioned side wall and the jacket 6 of the fine filter 5. At the top, the pipe 11 is provided with a collar 12 with which the pipe 11 is fixed in the liquid separator 1.

In this example, the side wall of the vessel 2 is made thicker at the top and extends practically radially up to the pipe 11 in this case. Moreover, the side wall of the vessel 2 is provided with a rebate 13 or circular groove at the top in which, in the present example, the above-mentioned collar 12 of the pipe 11 is held.

The invention is not restricted to this manner of mounting the pipe 11; on the contrary, the pipe 11 can be connected to the lid 7 and/or to the side wall of the vessel 2 in many different ways, for example by welding, gluing this pipe 11 on the lid 7, by clamping said pipe 11 at the top in a press fit or by snapping it in or the like.

Also the fine filter 5 is in this case provided with an outward directed flange 14 at the top extending radially into the above-mentioned rebate 13 and making contact with the collar 12 of the pipe 11.

At the bottom, the fine filter 5 is sealed by a filter lid 15.

Between the lid 7 and the thicker part of the wall of the vessel 2 is situated a first sealing ring 16 in the shape of an O-ring provided in a circular groove 17 in the contact surface of the lid 7 in relation to the housing 3. A second sealing ring 18, also in the shape of an O-ring, is preferably provided between the lid 7 and the flange 14 of the fine filter 5.

According to a variant of a liquid separator 1 according to the invention, which is not represented in the drawings, the above-mentioned thicker part of the side wall can be replaced by an inward directed upper edge, or this thicker part can even be omitted.

The lid 7 is provided with a passage 19 which opens directly in the space between the fine filter 5 and the pipe 11, via a corresponding opening 20 in the flange 14 of the fine filter 5.

In this example, said passage 19 is provided with a screw thread in which a safety valve 21 is fixed, for example by means of a threaded nipple with which the safety valve 21 is screwed down in the passage 19.

Naturally, said safety valve 21 can be fixed in the passage 19 in many different ways or it can be connected to the latter, such that the invention is not restricted to the use of such a threaded connection.

The opening 20 in the flange 14 of the fine filter 5 is preferably situated between the first sealing ring 16 and the second sealing ring 18 and it is provided at the passage 19 in the lid 7.

The invention consists in that the safety valve 21 is connected to the above-mentioned outlet zone via the passage 19 in the lid 7, in other words without an opening in the pipe 11.

The working of a liquid separator 1 according to the invention is very simple and as follows.

The liquid/gas mixture, which in practice may consist for example of an oil/air mixture coming from an oil-injected compressor element, is introduced in an inlet zone at the top of the vessel 2 via the tangential inlet 4, which inlet zone is situated between the side wall of the vessel 2 and the pipe 11.

The liquid/gas mixture flows through the inlet zone, in the position of the liquid separator 1 as represented in the figures, from top to bottom, whereby, by preferably introducing the mixture tangentially in the vessel 2, the liquid/gas mixture in this case follows the cylindrical side wall of the vessel 2. During the above-mentioned downward movement, the above-mentioned mixture thus covers a distance which is several times larger than the perimeter of the vessel 2.

Thanks to the centrifugal forces, the heavier liquid particles of the mixture end up against the side wall of the vessel 2, as a result of which said particles subsequently flow down along said side wall of the vessel 2.

As soon as the mixture is situated at the bottom of the inlet zone, the first separation phase is terminated. The liquid which is separated during this first separation phase is collected at the bottom of the vessel 2.

At the end of the first separation phase, at the bottom of the inlet zone, the mixture flows around the free end of the pipe 11 to subsequently continue its upward path.

In this way the liquid/gas mixture ends up in the space situated between the pipe 11 and the jacket 6 of the fine filter 5, also called the outlet zone.

As the mixture is forced to take a bend of 180 degrees, due to the inertia, the heavier liquid particles will continue their downward movement. In this manner, a second separation phase takes place. The separated liquid is collected at the bottom of the vessel 2.

A third and final separation phase is realised by sending the mixture, as of the outlet zone, upward through the jacket 6 of the fine filter 5. The fine filter 5 takes the remaining liquid out of the mixture, which finally results in a mixture containing about 99.99% less liquid than the non-treated mixture.

After flowing through the fine filter 5, the mixture ends up in a final zone, after which the treated gas leaves the liquid separator 1 via the outlet 8 in the lid 7. Next, the gas can be used in a downstream application, for example in the case of compressed air for compressed air applications.

Due to circumstances, the pressure in the vessel 2 may quickly rise if for example an obstruction occurs in a system following the vessel 2.

Therefore the vessel 2 is provided with the safety valve 21 which will open in case the pressure in the vessel 2 becomes too high, as a result of which the pressure in the vessel 2 is reduced to a nominal value.

It is thereby essential that, in case an excess pressure occurs, for reasons mentioned in the introduction, the safety valve 21 blows off liquid/gas mixture coming from the outlet zone in the environment.

In order to make this possible, the safety valve 21 is connected to the outlet zone via a passage 19 in the lid 7 according to the invention. A positive result thereof is that no opening must be provided in the pipe 11 to connect the safety valve 21 to the outlet zone.

The safety valve 21 is preferably fixed to the lid 7, which is favourable for the compactness of the liquid separator 1.

Figure 3:
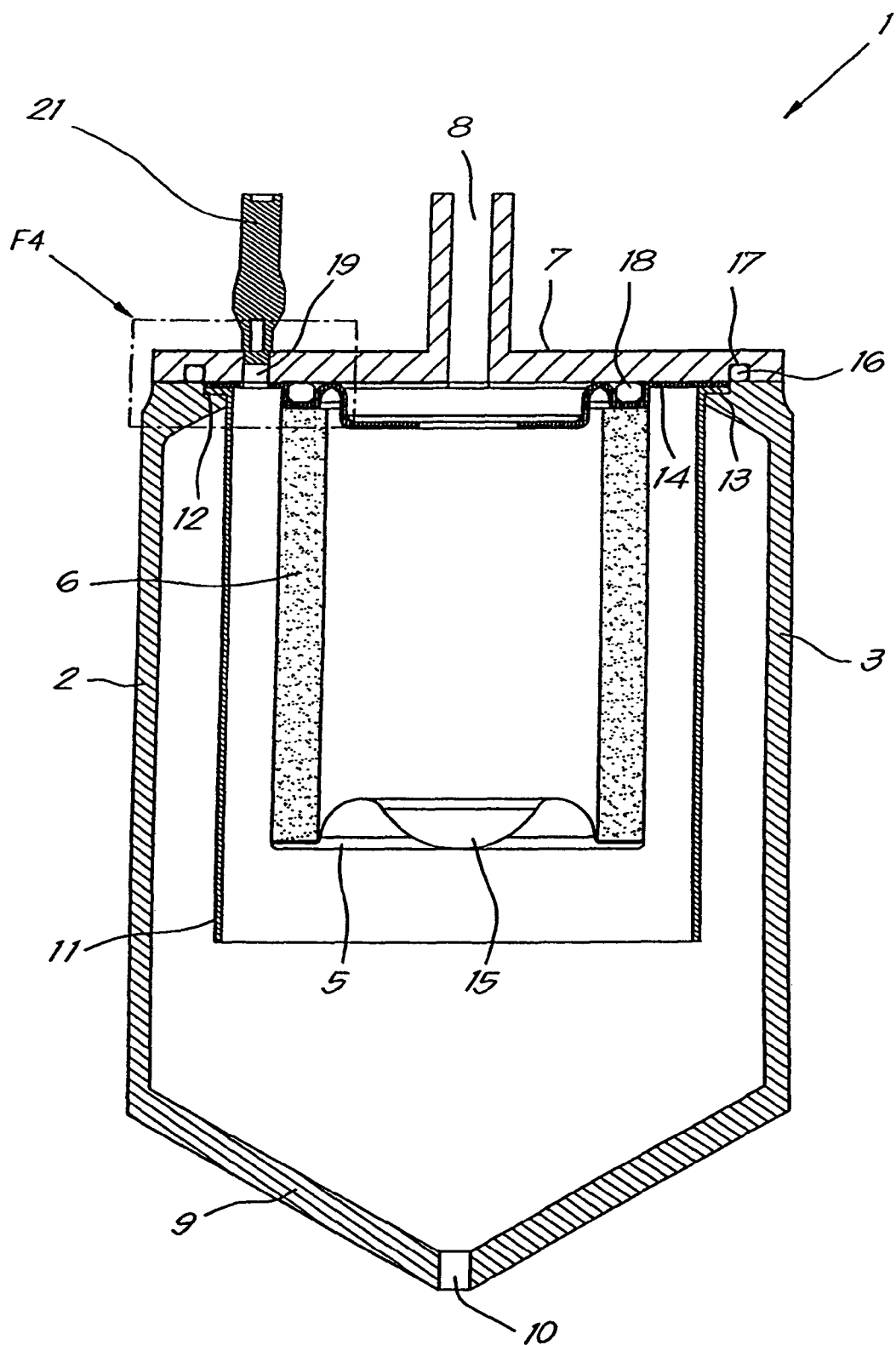
FIG. 3 shows a section according to line III-III in FIG. 1.
Figure 4:
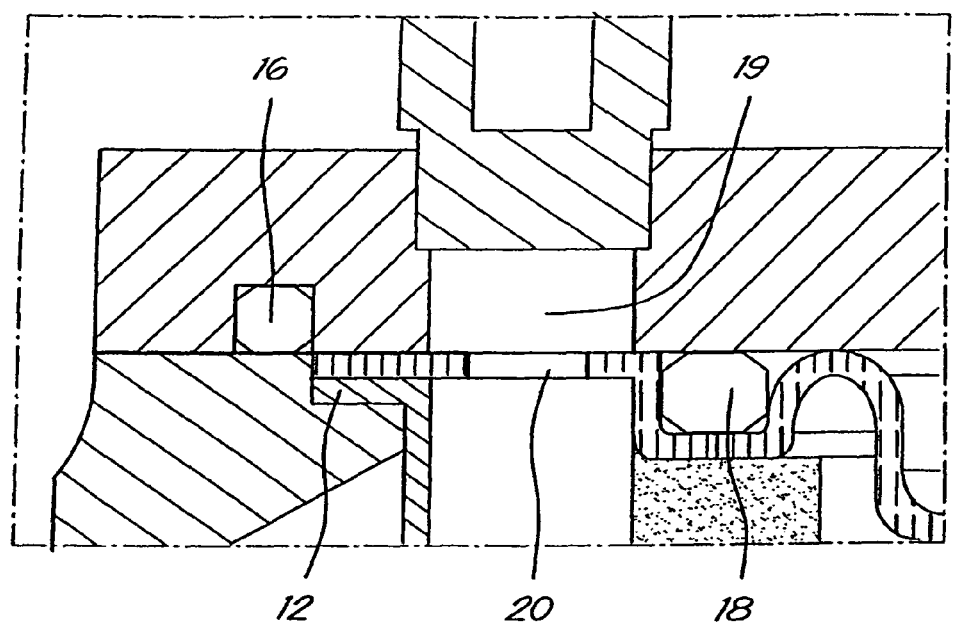
FIG. 4 shows a detail according to arrow F4 in FIG. 3.

The flange 14 of the fine filter 5 is provided with an opening 20 which, as shown in FIGS. 3 and 4, is provided at the passage 19 in the lid 7. In this way, in case of any excess pressure in the liquid separator 1, mixture from the outlet zone can be blown off via the above-mentioned opening 20 and via the passage 19 in the lid 7 through the safety valve 21.

FIGS. 3 and 4 also show that the opening 20 in the flange 14 of the fine filter 5 is situated between the first and the second sealing ring 16 and 18.

Providing a first and a second sealing ring 16, 18 respectively, offers a major advantage in that internal leakage flows are avoided and in that the mixture cannot flow out through the space situated between the lid 7 and the vessel 2.

The collar 12 of the pipe 11, as well as the flange 14 of the fine filter 5, make contact with the rebate 13 provided in the side wall of the vessel 2, whereby the above-mentioned flange 14 rests on the collar 12.

While the liquid separator 1 is being mounted, the lid 7 exerts a force on the flange 14 of the fine filter 5 via the second sealing ring 18, as a result of which the collar 12 of the pipe 11 is clamped between the above-mentioned flange 14 and the vessel wall.

In this way is obtained a metallic sealing between the vessel 2 and the pipe 11, as a result of which the leakage flow of mixture from the inlet zone to the outlet zone is avoided.

According to a preferred embodiment, the liquid separator 1 is provided with positioning means allowing to mount the fine filter 5 in a single possible position in the vessel 2, whereby the opening 20 in the flange 14 of the fine filter 5 is situated opposite the passage 19 in the lid 7.

Figure 2:
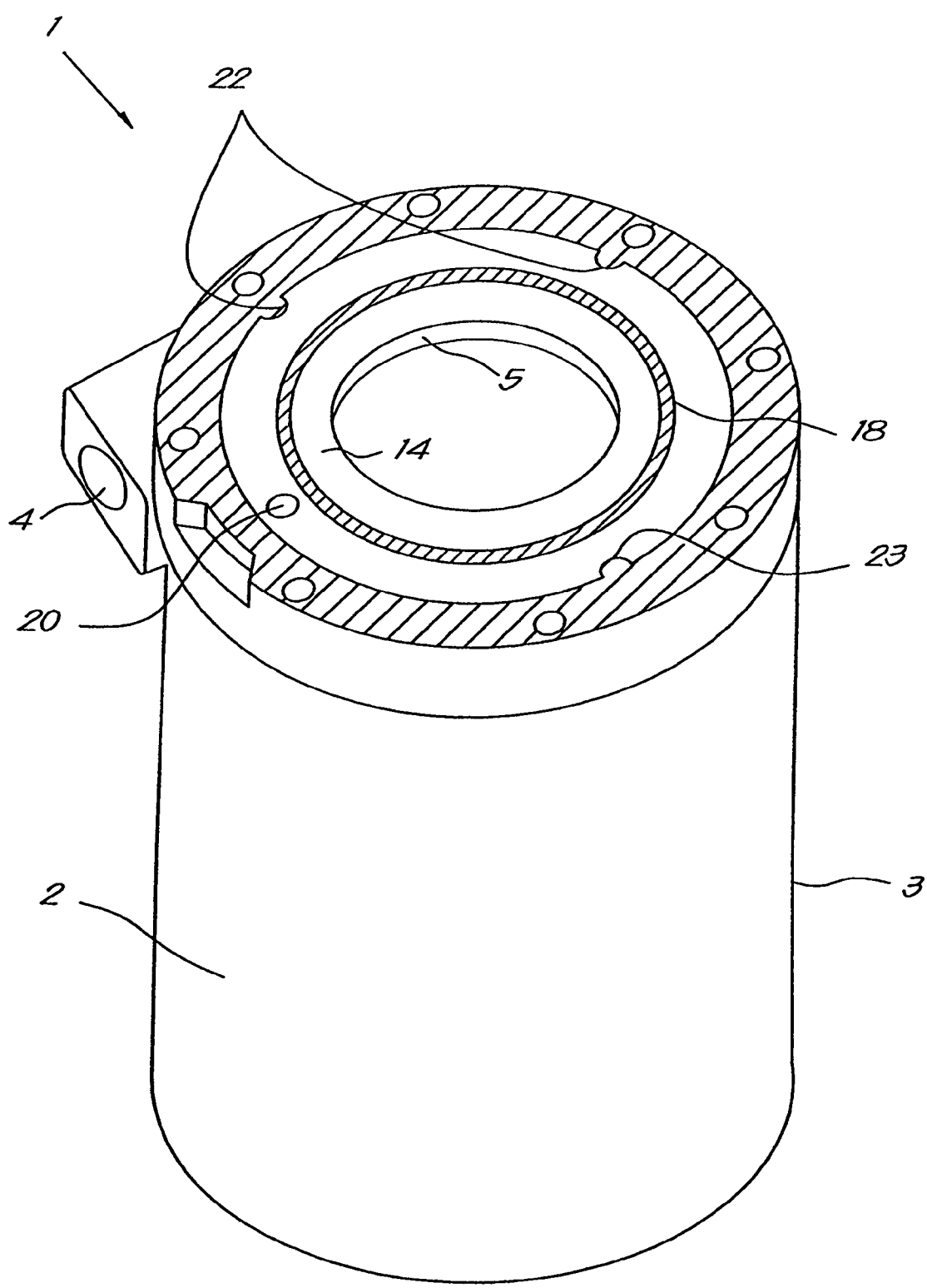
FIG. 2 shows the liquid separator according to FIG. 1 without any lid.

FIG. 2 shows such an embodiment whereby three locking elements 22 are provided in the rebate 13, co-operating with three recesses 23 provided in the flange 14 of the fine filter 5.

The use of the above-mentioned positioning means guarantees that, after having been mounted, the opening 20 in the flange 14 of the fine filter 5 will be situated at the passage 19 in the lid 7, which is necessary in order to procure a complete blow-off capacity.

As the safety valve 21 is fixed above the lid 7, the above-mentioned safety valve 21 can be mounted upright. In this way, there remains no condensed water in the safety valve 21, minimising the risk of corrosion of the safety valve 21.

The present invention is by no means restricted to the embodiments described by way of example and represented in the accompanying drawings; on the contrary, such a liquid separator according to the invention can be made according to different variants and many shapes and dimensions while still remaining within the scope of the invention.

The invention claimed is:

1. A liquid separator comprising:
a vessel having a housing, said housing having an inlet for a liquid/gas mixture, said inlet further defining a space that is sealed at its top by a lid having an outlet for a discharge of treated gas;
a pipe being located in said space and extending around said outlet in the space at the lid;
a fine filter extending in the space around the outlet at the lid so that, between the pipe and the fine filter, there is defined an outlet zone;
said outlet zone connected to an environment by a safety valve; and
said safety valve being connected to the outlet zone via a passage in the lid.

2. The liquid separator according to claim 1, wherein the safety valve is fixed to the lid.

3. The liquid separator according to claim 1, wherein, between the lid and the housing, a first sealing ring is provided.

4. The liquid separator according to claim 3, wherein an opening in the flange of the fine filter is located radially between a first sealing ring and a second sealing ring.

5. The liquid separator according to claim 3, wherein the sealing rings are of an O-ring type, said sealing rings being clamped between the lid and the housing, the lid and a flange of the fine filter, respectively.

6. The liquid separator according to claim 1, wherein a side wall of the vessel is provided with a rebate at a top of the wall, and the fine filter is provided with an outwardly directed flange located at a top of the fine filter, and said flange is held in the rebate.

7. The liquid separator according to claim 6, wherein the flange is provided with an opening positioned opposite the passage in the lid.

8. The liquid separator according to claim 7, wherein the liquid separator is provided with a positioning means enabling mounting of the fine filter in a single possible position in the vessel, and wherein the opening in the flange of the fine filter is located opposite the passage in the lid.

9. The liquid separator according to claim 6, wherein a second sealing ring is provided between the lid and the flange of the fine filter.

10. The liquid separator according to claim 9, wherein an opening in the flange of the fine filter is located radially outside the second sealing ring.

11. The liquid separator according to claim 6, wherein the pipe is provided with a collar at a top of the pipe, said collar making contact with the rebate.

12. The liquid separator according to claim 11, wherein the flange of the fine filter rests on the collar.

13. A liquid separator comprising:
a vessel having a housing, said housing having an inlet for a liquid/gas mixture, said inlet further defining a space that is sealed at its top by a lid having an outlet for a discharge of treated gas;
a pipe being located in said space and extending around said outlet in the space at the lid;
a fine filter extending in the space around the outlet at the lid so that, between the pipe and the fine filter, there is defined an outlet zone;
said outlet zone connected to an environment by a safety valve; and
said safety valve being connected to the outlet zone via a passage in the lid;

wherein a collar is provided at a top of the pipe, and an outwardly directed flange is provided at a top of the fine filter extending radially and making contact with the collar of the pipe.

14. The liquid separator according to claim 13, wherein the flange includes an opening provided at the passage in the lid.

* * * * *